United States Patent [19]

Falcoff

[11] Patent Number: 5,062,559
[45] Date of Patent: Nov. 5, 1991

[54] OVERHEAD CONSOLE

[75] Inventor: Monte L. Falcoff, Southfield, Mich.

[73] Assignee: United Technologies Automotive, Dearborn, Mich.

[21] Appl. No.: 388,269

[22] Filed: Aug. 1, 1989

[51] Int. Cl.$^5$ .............................................. B60R 7/04
[52] U.S. Cl. .................................... 224/311; 296/37.8
[58] Field of Search ............................ 224/311, 42.42; 296/37.7, 37.8

[56] References Cited

U.S. PATENT DOCUMENTS

| 4,241,870 | 12/1980 | Marcus | 296/37.7 |
| 4,722,565 | 2/1988 | Kanou et al. | 296/214 X |
| 4,783,110 | 11/1988 | Beukema | 224/311 X |
| 4,844,533 | 7/1989 | Dowd et al. | 296/37.7 X |
| 4,854,632 | 8/1989 | Kreuze et al. | 296/37.8 X |

FOREIGN PATENT DOCUMENTS

| 198138 | 12/1982 | Japan | 296/37.8 |
| 2121365 | 12/1983 | United Kingdom | 224/311 |

*Primary Examiner*—Henry J. Recla
*Assistant Examiner*—Robert M. Fetsuga

[57] ABSTRACT

An overhead console (5) for an automobile or the like includes a storage compartment (20) disposed between a headliner (30) and the roof structure of the vehicle for efficient utilization of space. The compartment is covered by the headliner for enhanced aesthetic appeal.

17 Claims, 8 Drawing Sheets

OVERHEAD CONSOLE

DESCRIPTION

1. Technical Field

This invention relates generally to overhead consoles for motor vehicles and specifically to such overhead consoles having enhanced storage capacity and appearance.

2. Background Art

As automotive design and technology evolve, more and more electronic accessories such as advanced audio systems, computers, and the like find their way into modern automobile instrument panels. Accommodation of such accessories in the instrument panels leaves little extra room for storage therein. Today's sophisticated automobile purchaser demands interior storage which often-times cannot be fulfilled by the traditional instrument panel glove compartment. Thus, modern automotive interiors employ many diverse storage compartments such as bins and trays in such areas as the instrument panel, interior door panels, and center consoles located between the driver and passenger's seat.

Recently, automobile ceilings has been explored as locations for storage compartments for such objects as garage door opener remote controls and the like. For the most part, such storage compartments have taken the form of after-market add-on (installed after the automobile is assembled) compartments which generally occupy space below the automobile's headliner. While such compartments may offer some limited useful storage capacity, they detract significantly from the appearance of the automobile's interior since they disrupt the continuity of the color and texture of the headliner fabric and thus have proven generally unacceptable for use in luxury and sophisticated, high performance automobiles. Moreover, in projecting downwardly from the vehicle's headliner, such add-on compartment take up significant amounts of forward headroom.

DISCLOSURE OF INVENTION

In accordance with the present invention, a spacious and attractive automobile storage console comprises a storage compartment disposed between a motor vehicle headliner and the roof thereof. Thus, the space between the headliner and the roof is efficiently used for storage whereby the console intrudes only minimally into the vehicle's interior and thus takes up minimal headroom. The compartment is covered over the lower portion of the outer surface thereof with headliner material for enhanced visual appeal. In one embodiment, the console includes a single opening into the interior of the storage compartment, this opening being surrounded by a decorative bezel which clamps the headliner to the storage compartment and maintains the registry of the openings in the headliner and storage compartment. The storage compartment may include a second opening which accommodates an electrical accessory therein such as a courtesy light panel.

In an alternate embodiment of the present invention, the storage compartment may comprise a pair of discrete bins which open to the sides of the console and are closable by sliding doors so that both the driver and front seat passenger of the motor vehicle have convenient access to storage within the console.

In yet another embodiment of the present invention, the bezel is provided with a panel which forms a rear wall of the storage compartment and receives an auxiliary electrical outlet therein for powering such accessories as auxiliary lighting, audio equipment and the like. The bezel may also include a drop-down storage device such as a pivotable hanger for accommodating sunglasses and the like.

The compartment and bezel are conveniently formed by molding any of various suitable known plastics and are attached to the vehicle roof structure at a central longitudinal rib and windshield header by any suitable means such as snap-fasteners or the like.

BEST MODE FOR CARRYING OUT THE INVENTION

Figure 1:
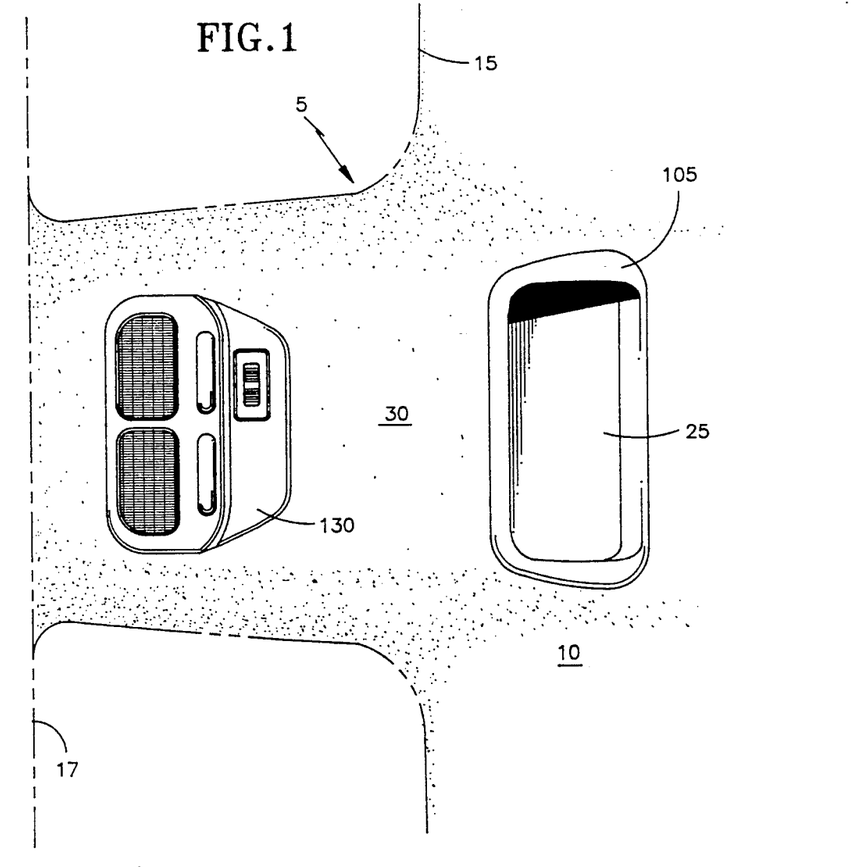
FIG. 1 is a plan view of the overhead console of the present invention.
Figure 2:
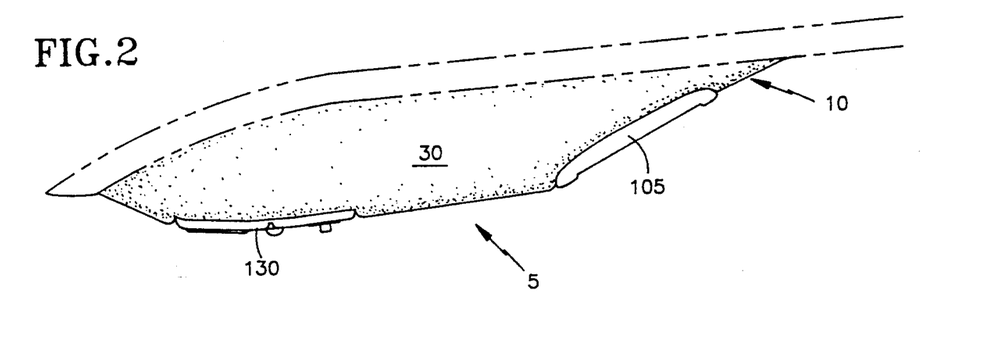
FIG. 2 is a side elevation of the overhead console shown in FIG. 1.
Figure 3:
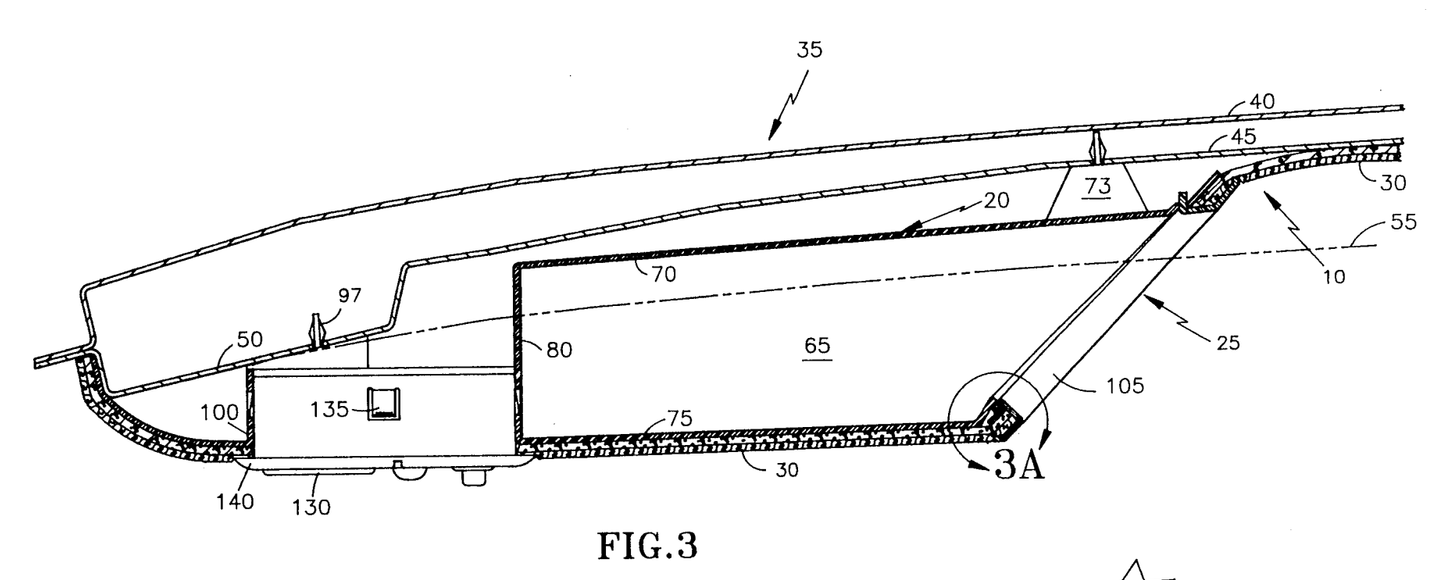
FIG. 3 is a sectioned elevation of the overhead console shown in FIG. 1.
Figure 3A:
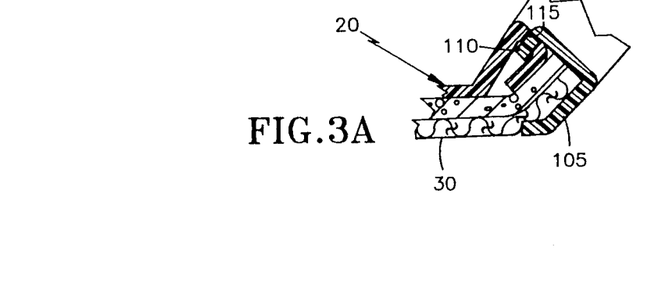
FIG. 3A is an enlargement of that portion of FIG. 3 within circular line 3A.

Referring to FIGS. 1 through 3, the overhead console 5 of the present invention is shown at the forwardmost portion of an automobile ceiling 10. For reference purposes, the vehicle's sunvisors are shown in phantom at 15 and the forward edge of the roof at 17.

Figure 4:
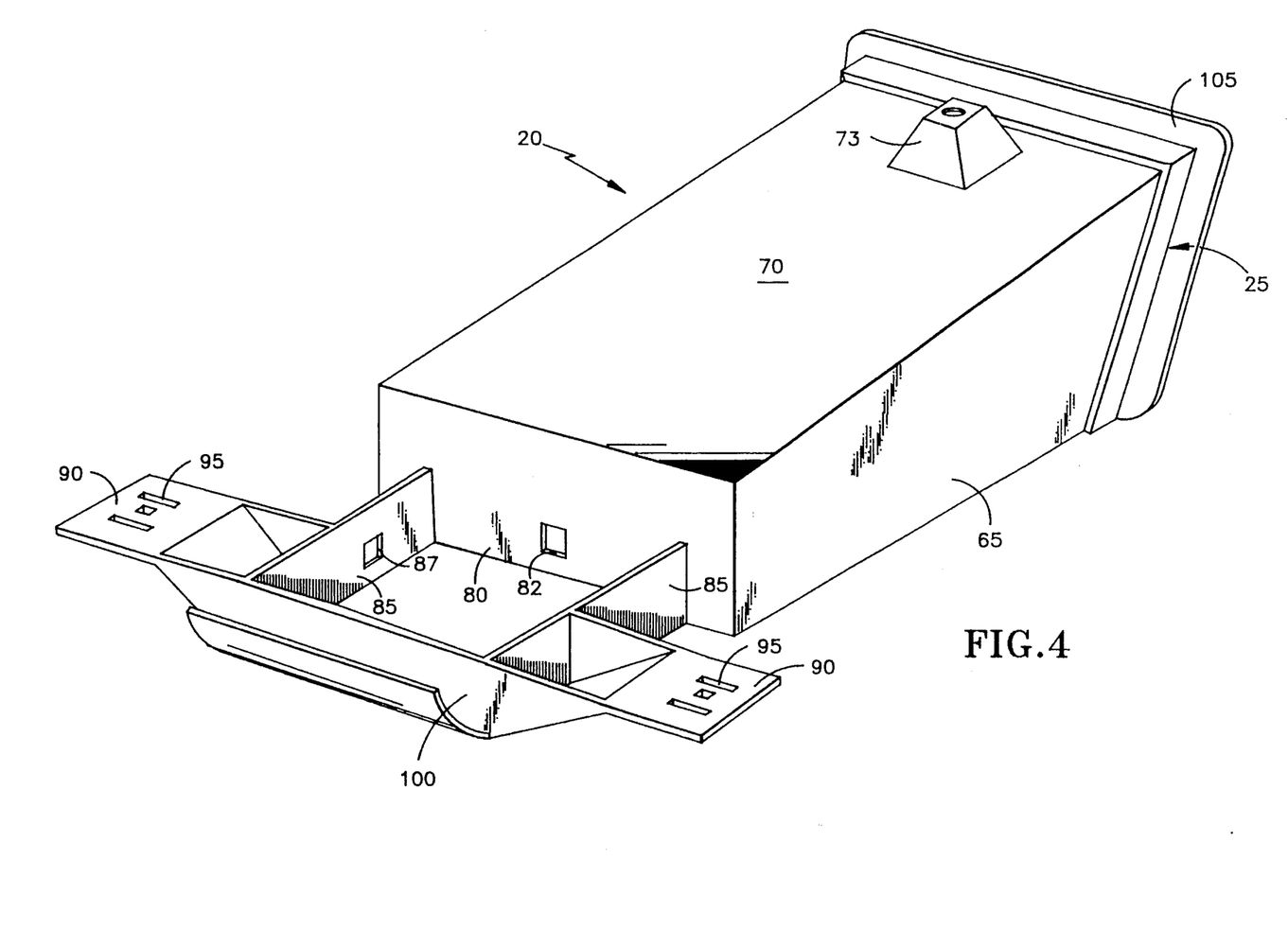
FIG. 4 is a perspective view of a storage compartment employed in the overhead console shown in FIG. 1.

As perhaps best seen in FIGS. 3 and 4, the overhead console comprises a storage compartment 20 having a rear opening 25 therein. Storage compartment 20 is disposed between the vehicle's headliner 30 and the roof structure 35 which includes exterior roof panel 40, central, longitudinal reinforcing rib 45 and forward windshield header 50. Thus the storage compartment occupies, and thus utilizes as useful storage space, that space between the roof structure 35 and the nominal headliner surface indicated by phantom line 55 extending rearwardly from the surface of windshield header 50. This effective utilization of such space which, in the prior art, has been unused for storage, minimizes the intrusion of the console into the ceiling area of the vehicle's passenger compartment and therefore, detracts minimally from useful headroom.

Referring to FIG. 4, storage compartment 20 comprises a wall structure molded from polypropylene or an equivalent moldable material such as any of various known plastics. The wall structure includes a pair of generally parallel sidewalls 65, upper wall 70 with integral apertured mounting stud 73, and a lower wall 75 which supports articles stored within the console. A forward wall 80 having hole 82 therein, is provided with side extensions 85 with holes 87 therein. Integral mounting brackets 90 extend laterally from side extensions 85. Brackets 90 are apetured at 95 to receive suitable fasteners such as snap-fasteners 97 (FIG. 3) or the like which are received within holes 95 and mating holes (not shown) in windshield header 50. The forwardmost ends of extensions 85 are connected by forward wall 100.

As best seen in FIGS. 2 and 3, the console is covered over the lower portion of the outer surface thereof by headliner 30 which, during the manufacture thereof, may be molded to a shape to conform to the general form of the lower portion of compartment 20. The headliner includes an aperture in registry with aperture 25 in compartment 20, this registry being maintained by bezel 105 which is fixed to compartment 20 by means of the reception of snap-tabs 110 integrally molded into the edge of the bezel, within slots 115 disposed around the compartment 20 adjacent opening 25, thereby clamping the headliner between the compartment and the bezel. An accessory such as courtesy lamp module 130 is received within the opening defined by forward walls 80 and 100 and side extensions 85. Snap tabs 135 molded into the sides of the light module fit within holes 82 and 87 in forward wall 80 and side extensions 85 to secure the light module in place in compartment 20. A decorative bezel 140 which is slightly larger than the opening in which the module fits, clamps the headliner between the bezel and compartment 20.

Figure 5:
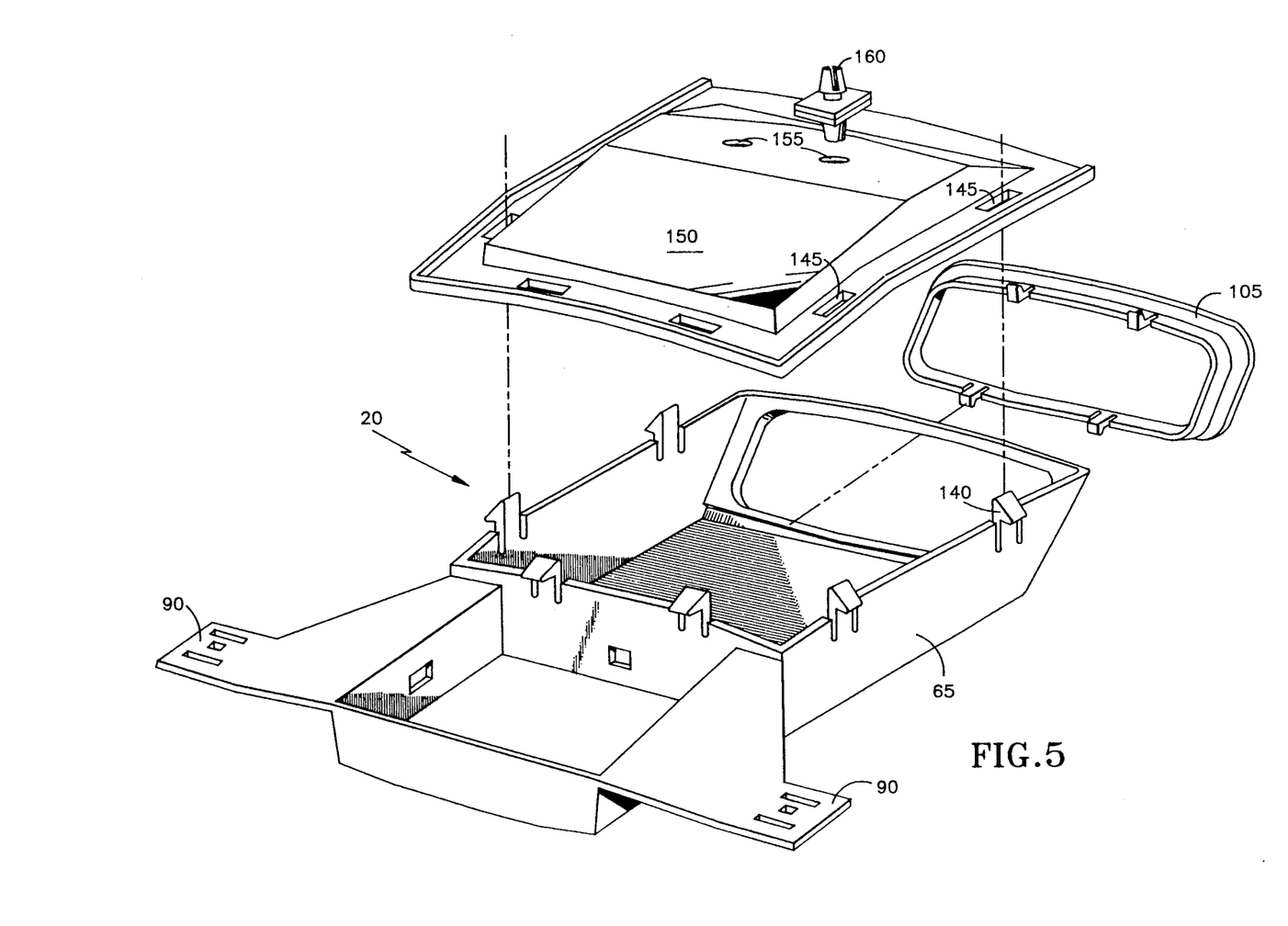
FIG. 5 is an exploded perspective view of an alternate embodiment of the storage compartment employed in the overhead console of FIG. 1.

Referring to FIG. 5, an alternate embodiment of the storage compartment is shown. While the storage compartment of FIGS. 3 and 4 was shown as being molded in a single piece, as for ease of manufacturability, a storage compartment having a separate upper wall may be desirable. As shown in FIG. 5, the forward and side walls of the storage compartment may be provided with integral snap hooks 140 which are received within mating slots 145 molded in upper wall 150. Upper wall 150 may also be provided with a plurality of apertures 155 therein which receive snap fasteners 160 to secure the upper wall to roof rib 45. The remainder of the compartment is essentially the same as that of FIG. 4, including the same general arrangement for accommodating lamp module 130 and attaching the compartment to windshield header 50.

Figure 6:
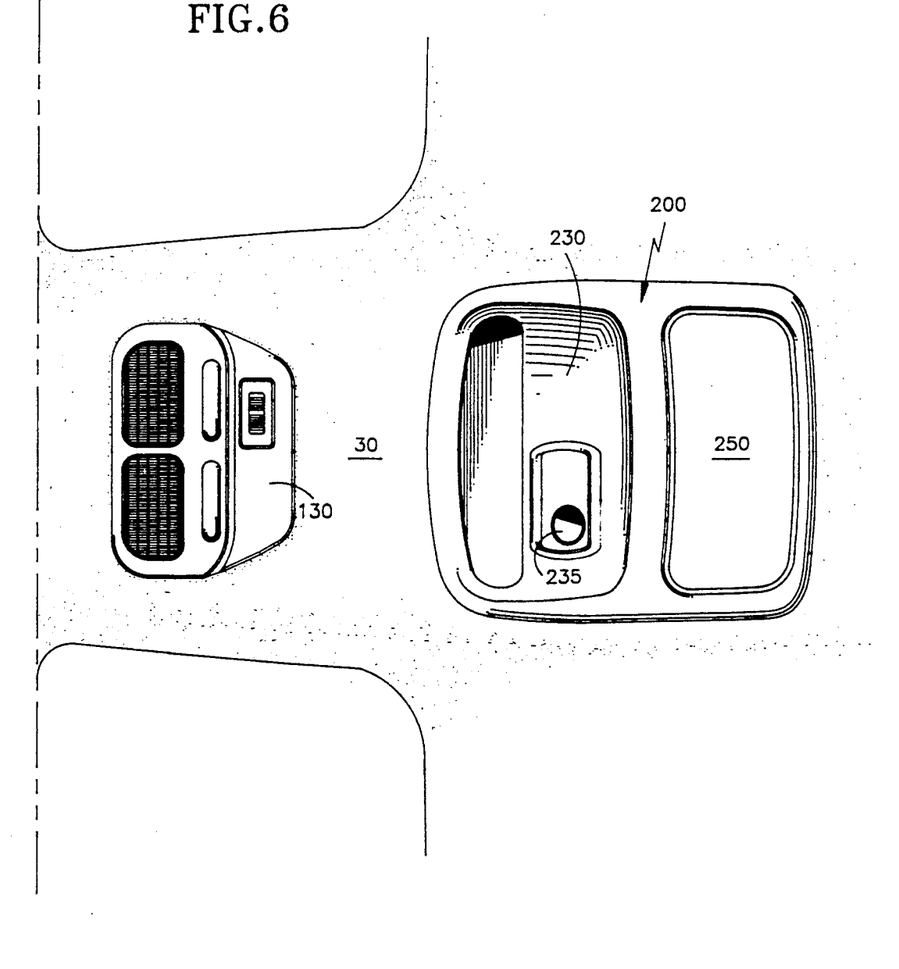
FIG. 6 is a plan view of a first alternate embodiment of the overhead console of the present invention.
Figure 7:
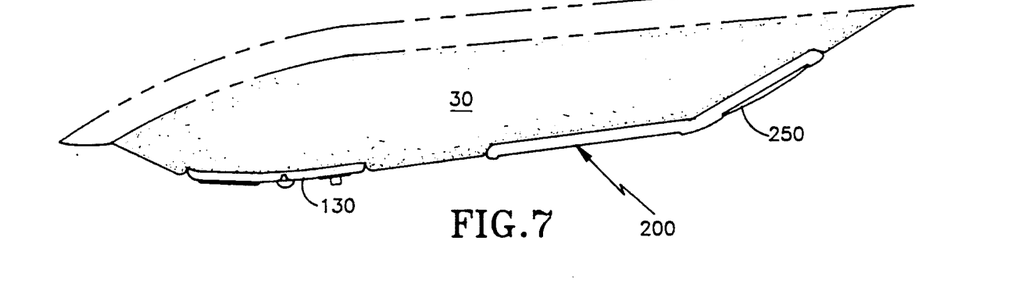
FIG. 7 is a side elevation of the overhead console shown in FIG. 6.
Figures 8, 8A, 8B:
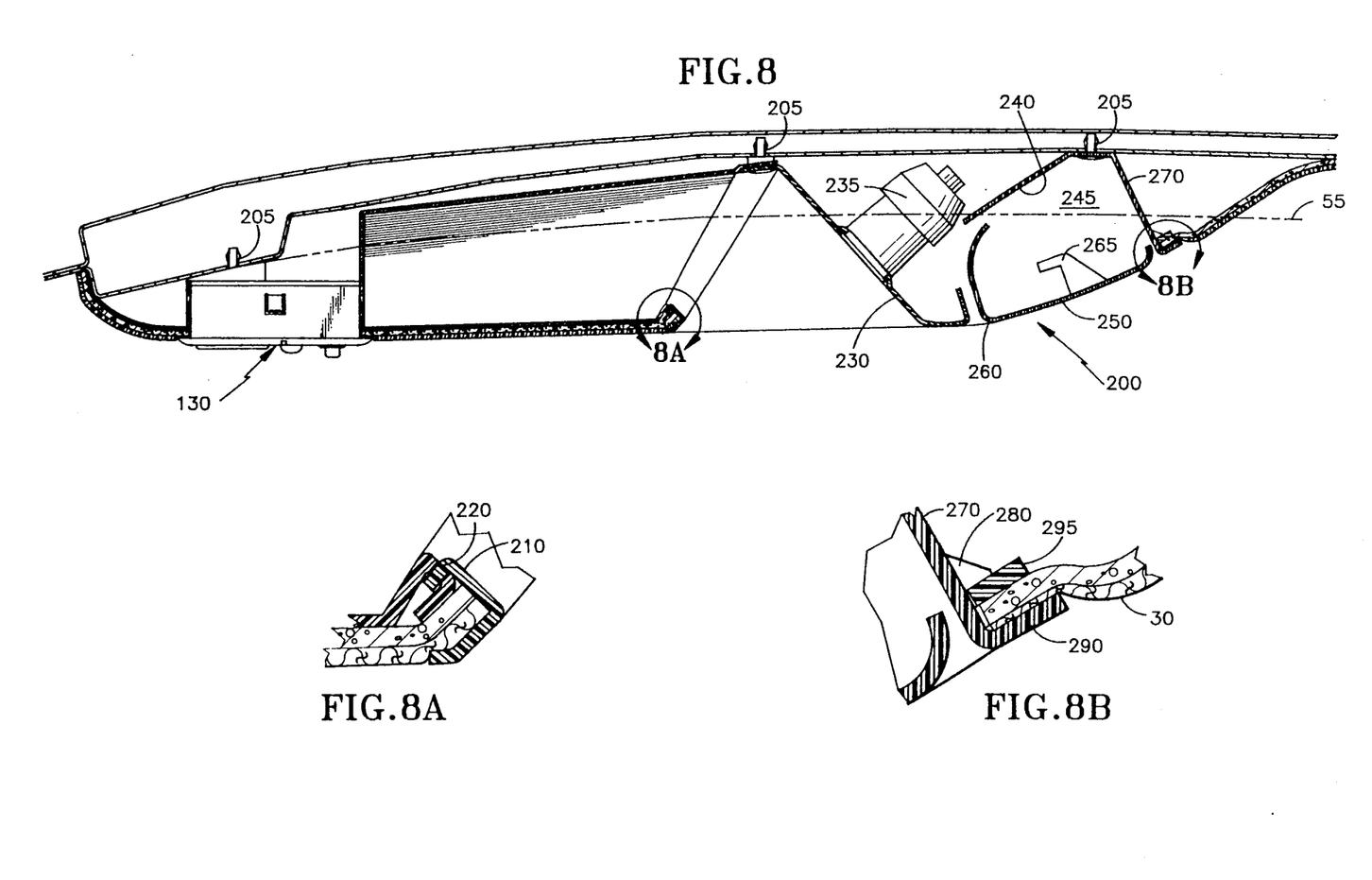
FIG. 8 is a sectioned elevation of the overhead console shown in FIGS. 6 and 7.
FIG. 8A is an enlargement of that portion of FIG. 8 within circular line 8A.
FIG. 8B is an enlargement of that portion of FIG. 8 within circular line 8B.

FIGS. 6, 7 and 8 disclose a first alternate embodiment of the overhead console of the present invention. As in the embodiment illustrated in FIGS. 1 through 5, in this alternate embodiment, the compartment occupies the space between the nominal headliner surface (illustrated by phantom line 55) and the roof structure of the vehicle thereby intruding minimally into the passenger compartment of the vehicle. The console is covered by the headliner along the lower portion of the outer surface thereof, thereby interrupting the visual continuity of the headliner to only a minimal extent. The storage compartment accommodates lamp module 130 or similar accessory in the same manner as illustrated and described hereinabove.

The principal difference between this first alternate embodiment and that of FIGS. 1 through 5 lies in bezel 200. Bezel 200 is fastened to the roof central rib by snap-fasteners 205 and to compartment 20 by snap hooks 210 integrally molded into a lower portion of the forwardmost edge of the bezel, the snap hooks being received within mating slots 220 adjacent the opening to compartment 20, clamping headliner between the bezel and the compartment in a manner similar to that described hereinabove. As best seen in FIG. 8, bezel 200 includes a wall 230 which forms the rear wall of compartment 20. Wall 230 is apertured to receive an auxiliary electrical outlet 235 connected by suitable wiring (not shown) to the vehicle's electrical system. Outlet 235 provides a convenient location to plug in such accessories as auxiliary audio equipment, auxiliary lighting or the like. Bezel 200 also includes an upper wall 240 by which the bezel is attached to the roof's central rib and which defines the upper boundaries of a storage compartment 245 which is closed by door 250. Door 250 may include a latch which, when actuated by pushing thereon, releases door 250 to pivot downwardly about edge 260 to expose the contents of compartment 245. Door 250 may be provided with hooks 265 by which items such as sun glasses may be hung on to the interior of the door.

As best seen in FIG. 8b, bezel 200 includes a rear wall 270 having integral teeth 280 and a continuous shoulder 290 molded therein. The teeth and shoulder define a channel which receives a retainer 295 which, with shoulder 290 and teeth 280 clamps the headliner 30 to the bezel.

Figure 9:
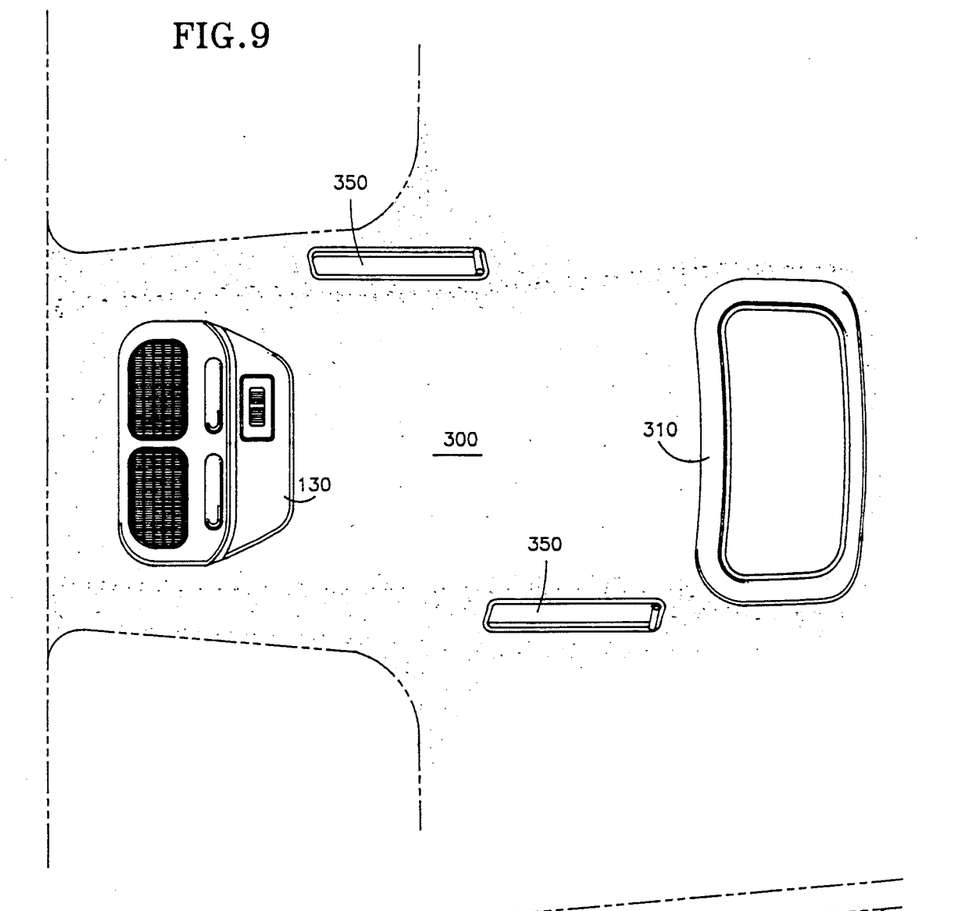
FIG. 9 is a plan view of a second alternate embodiment of the overhead console of the present invention.
Figure 10:
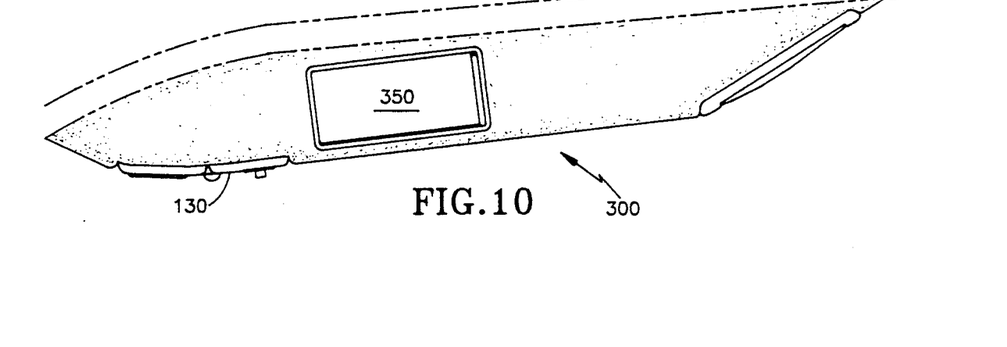
FIG. 10 is a side elevation of the overhead console shown in FIG. 9.
Figure 11:
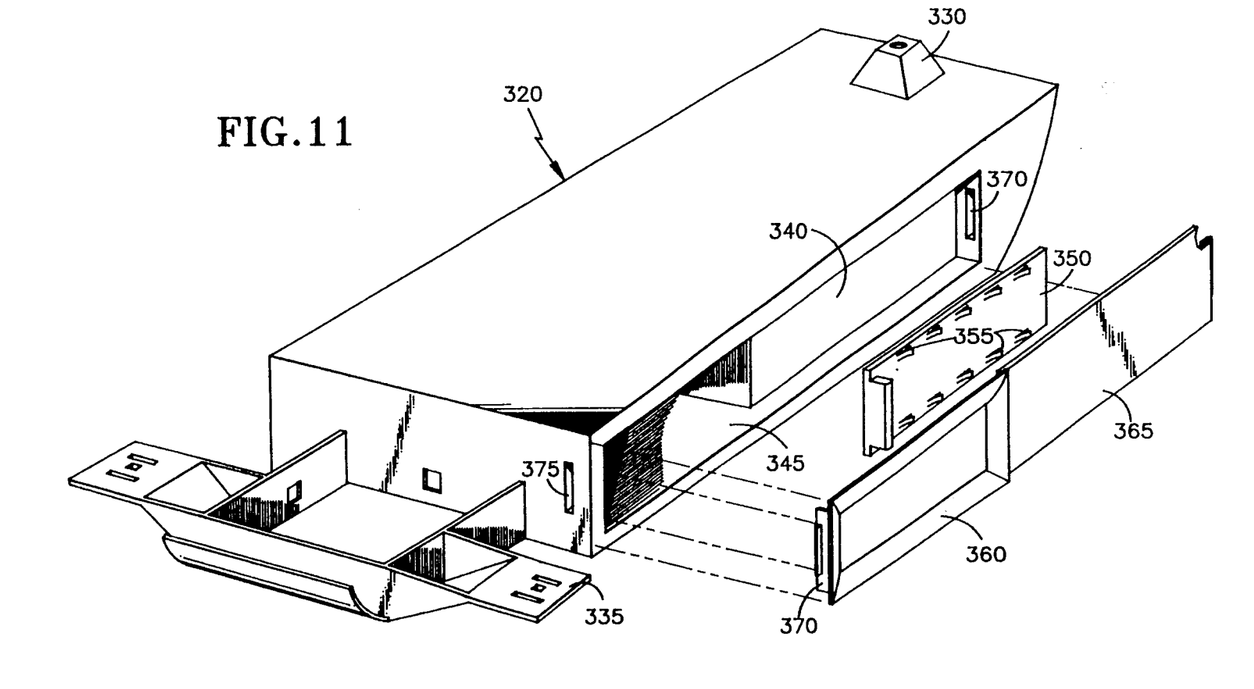
FIG. 11 is an exploded perspective view of a storage compartment employed in the overhead console shown in FIGS. 9 and 10.

A second alternate embodiment of the present invention is shown in FIGS. 9, 10 and 11. The overhead console 300 of this second alternate embodiment is, like that of the first two embodiments, space efficient, occupying the space between the nominal headliner surface and the vehicle roof and is covered with the headliner along the lower portion of the outer surface thereof for enhanced visual appearance. Also like the overhead consoles illustrated and described hereinabove, console 300 can accommodate light module or similar accessory 130 and includes a rearwardly facing opening surrounded by a decorative bezel 310 which may also serve to clamp the headliner material between the bezel and compartment 320 (see FIG. 1). As best seen in FIG. 11, compartment 320 comprises a wall structure including mounting stud 330 and brackets 335 for mounting the compartment to the roof center rib and windshield header in the manner described hereinabove. However, unlike the compartments shown and described in conjunction with FIGS. 1 through 8, compartment 320 is formed with two oppositely opening discrete bins 340 and 345 therein. Each of the bins is closed by a sliding door 350. Doors 350 each include two rows of resilient tabs 355 molded therein and are slideably received in tracks defined by bezel 360, the back of an opposite bin (340 as shown in FIG. 11) and the compartment upper and lower walls. Bezel 360 includes an integral guide 365 and snap-lock tabs 370 which are received within mating apertures 375 in the compartment walls. Tabs 355 urge door 350 inwardly to prevent rattling of the door within the tracks. As was the case with the bezels shown in the embodiments of FIGS. 1 through 8, bezel 360 may also serve to clamp the headliner material between itself and compartment 320. As best shown in FIGS. 9 and 10, the two discrete compartments defined by the opposite opening bins allow convenient access to the interior of the console for the storage of personal items such as sun glasses and the like to both the driver and passenger of the motor vehicle.

It will be appreciated that the overhead console of the present invention represents a significant improvement in automobile overhead storage. Since the console uses the room between the nominal headliner surface and the vehicle roof, it intrudes only minimally into the vehicle passenger compartment. Since the storage compartment is disposed above the headliner, it may be completely covered by the headliner for enhanced aesthetics. As set forth hereinabove, it may be provided with a number of openings and doors facing rearwardly or sideways and may also be provided with such accessories as electric power outlets and auxiliary storage compartments.

While a number of specific embodiments of this console have been disclosed, it will be appreciated that various modifications may be made to these consoles without departing from the present invention. For example, while the storage compartments have in some instances been shown to open rearwardly without doors or other closures, it will be appreciated that doors may be provided without departing from the invention. While various materials have been disclosed in an exemplary fashion, various other materials may of course be employed. It is intended by the following claims to cover these and any other departures from these disclosed embodiments which fall within the true spirit of this invention.

Having thus described the invention, what is claimed is:

1. An overhead center console for a motor vehicle or the like having a roof provided with a windshield header, the interior surface of said roof being covered by a headliner, said console including a compartment for the storage of objects therein and characterized by:
   said compartment being attached to said windshield header from therebelow;
   said compartment being disposed between said headliner and said vehicle roof such that at least a portion of said compartment lies above the nominal surface of said headliner, said compartment being covered over the lower portion of the outer surface thereof by said headliner,
   said compartment being provided with a first opening for access to the interior thereof,
   said first compartment opening being adapted for registry with a first opening in said headliner; and
   a bezel for providing a decorative covering for the registry of said first compartment opening with said first headliner opening.

2. The overhead console of claim 1 characterized by:
   said compartment being provided with a second opening for accommodating an accessory therewithin;
   said second compartment opening being adapted for registry with a second opening in said headliner.

3. The overhead storage compartment of claim 1 characterized by said compartment including means thereon for mounting said compartment to said vehicle roof.

4. The overhead console of claim 3 characterized by said mounting means comprising at least one bracket, said bracket being apertured to receive a fastener therein for engagements with said compartment and said vehicle roof.

5. The overhead console of claim 4 characterized by said fastener comprising a snap fastener.

6. The overhead console of claim 1 characterized by:
   said compartment comprising a wall structure; and
   an auxiliary electrical power outlet received within and supported by said wall structure and accessible through said first opening.

7. The overhead console of claim 1 characterized by said electrical power outlet being received within and supported by a rear wall of said wall structure, adjacent said first opening.

8. The overhead console of claim 7 characterized by:
   said bezel including first and second openings therein;
   said first bezel opening being disposed in registry with said first compartment opening for access to the interior of said compartment and said auxiliary electrical power outlet;
   said bezel including means for storing objects therein, between said bezel and said vehicle roof, said second bezel opening being disposed in registry with said bezel storage means for access thereto.

9. The overhead console of claim 1 characterized by said bezel storage means comprising a pivotable hanger.

10. The overhead console of claim 1 characterized by:
    said compartment being provided with a second opening for access to the interior thereof;
    said headliner including a second opening therein, in registry with said second compartment opening; and
    a second bezel for providing a decorative cover for the registry of said second compartment opening with said second headliner opening;
    said compartment being defined by a wall structure, said first and second openings being disposed in opposed side walls, thereby facing a driver and front seat passenger of said motor vehicle.

11. The overhead console of claim 10 characterized by:
    said compartment comprising first and second discrete bins;
    said first and second compartment openings providing access to said first and second discrete bins respectively.

12. The overhead console of claim 10 characterized by said first and second openings being selectively closable by first and second slideable doors.

13. The overhead console of claim 12 characterized by said first and second bezels including guides thereon, which, with said compartment, define tracks within which said first and second doors are slideably received.

14. The overhead console of claim 13 characterized by each of said first and second doors being provided with means thereon to prevent said doors from rattling within said tracks.

15. The overhead console of claim 14 characterized by said rattling prevention means comprising at least one resilient tab extending outwardly from a corresponding door for biasing said door against a single side of a corresponding one of said tracks.

16. The overhead console of claim 1 characterized by said bezel including means thereon for fastening said bezel to said compartment and clamping said headliner therebetween around the periphery of said first opening.

17. The overhead compartment of claim 16 characterized by said fastening means comprising a snap fastener.

* * * * *